US006764231B1

(12) United States Patent
Shubert

(10) Patent No.: US 6,764,231 B1
(45) Date of Patent: Jul. 20, 2004

(54) BODY MOUNTED CAMERA SUPPORT

(76) Inventor: Cory Shubert, 5013 - 40th St. W., St. Louis Park, MN (US) 55416

( * ) Notice: Subject to any disclaimer, the term of this patent is extended or adjusted under 35 U.S.C. 154(b) by 0 days.

(21) Appl. No.: 10/352,605

(22) Filed: Jan. 28, 2003

(51) Int. Cl.$^7$ .................................................. G03B 17/00
(52) U.S. Cl. ....................................... 396/419; 396/428
(58) Field of Search .................................. 396/419, 428

(56) References Cited

U.S. PATENT DOCUMENTS

| | | | |
|---|---|---|---|
| 1,993,485 A | * | 3/1935 | Paul .......................... 224/185 |
| 2,603,134 A | * | 7/1952 | Burnam ..................... 224/185 |
| 2,636,822 A | | 4/1953 | Anderson |
| 3,273,484 A | | 9/1966 | Lapsley |
| 3,332,593 A | | 7/1967 | Fauser |
| 3,882,524 A | | 5/1975 | Rauscher |
| 4,083,480 A | | 4/1978 | Lee et al. |
| 4,156,512 A | | 5/1979 | Brown |
| 4,158,490 A | | 6/1979 | Gottschalk et al. |
| 4,208,028 A | | 6/1980 | Brown et al. |
| 4,298,149 A | | 11/1981 | Gottschalk et al. |
| 4,387,839 A | * | 6/1983 | Dranchak .................. 224/265 |
| 4,526,308 A | | 7/1985 | Dovey |
| 4,687,309 A | * | 8/1987 | Breslau ..................... 396/423 |
| 4,976,387 A | | 12/1990 | Spianti |
| 5,042,763 A | * | 8/1991 | Wong ...................... 248/178.1 |
| 5,128,701 A | | 7/1992 | Hampton |
| 5,294,947 A | | 3/1994 | Harrington |
| 5,462,214 A | | 10/1995 | Buswell |
| 5,528,846 A | * | 6/1996 | Baggett ........................ 42/94 |
| 5,749,010 A | * | 5/1998 | McCumber ................ 396/420 |
| 5,806,734 A | | 9/1998 | Scott |
| 5,819,461 A | | 10/1998 | Killian |
| 5,890,025 A | | 3/1999 | Hart |
| 6,056,449 A | | 5/2000 | Hart |
| 6,336,576 B1 | | 1/2002 | Easter |

OTHER PUBLICATIONS

Internet Article: "King Cobra Action Head," www.kirkphoto.com/cobra.html, dated before Jan. 28, 2003, 6 pages.

* cited by examiner

Primary Examiner—David M. Gray
(74) Attorney, Agent, or Firm—Crompton, Seager & Tufte, LLC

(57) ABSTRACT

Body mounted support apparatuses are provided. In an illustrative embodiment, a shoulder harness is coupled to a belly plate, with a hinge provided on the belly plate. The hinge may allow motion about at least a first axis. An elongate member, such as a monopod, is provided having a first end and a second end. The elongate member may have an adjustable length. The first end of the elongate member is attached to the hinge, while the second end of the elongate member is adapted to receive one of several devices. Certain of the devices which may be received are adapted for holding a camera, such as a tilt head or a gimbal head. In further embodiments, the hinge allows motion about a second axis and/or allows rotational movement about the axis of the elongate member.

4 Claims, 7 Drawing Sheets

BODY MOUNTED CAMERA SUPPORT

FIELD OF THE INVENTION

The present invention is related to the field of photography. More specifically, the present invention is related to devices and methods for stabilizing and supporting a camera.

BACKGROUND OF THE INVENTION

A number of devices for supporting a camera while taking a picture or capturing video have been developed. Tripods provide a stable support and can stand by themselves, however, tripods typically take time to set up properly and are difficult to move quickly and set up in a new location. Monopods do not stand by themselves, but allow for use in uneven terrain and are relatively easy to move about.

Additional devices enable better mobility by providing a wearable camera support. For example, steady-camera devices allow a cameraperson to walk while capturing video with reduced image shakiness. However, most such devices are relatively expensive and heavy and are not well suited to uses outside of professional filmmaking.

Several devices have been suggested for supporting a camera by providing an apparatus which attaches to the upper torso of a photographer. Some examples include U.S. Pat. No. 4,526,308 to Dovey, U.S. Pat. No. 2,636,822 to Anderson, U.S. Pat. No. 3,332,593 to Fauser, U.S. Pat. No. 3,882,524 to Rauscher, and U.S. Pat. No. 6,336,576 to Easter. These devices, however, allow for limited movement of the camera and constrain the movement of the photographer.

SUMMARY OF THE INVENTION

The present invention includes camera support devices which help a photographer to keep a camera steady during use without overly restricting the movement of either the photographer or the camera. In a first embodiment, the present invention includes a camera support device including a shoulder harness which is attached to an extendible member which in turn connects to a belly plate. The belly plate is attached to a hinge which in turn attaches to a monopod. The hinge may include a mechanism allowing for movement about a significant range around a first axis extending forward out of the belly plate. In some embodiments, the range of movement may be an entire 360-degree range of motion, while in other embodiments, stops may be provided to limit the range of motion about the axis.

The hinge may also allow for freedom of movement of the monopod about a second axis. The second axis may allow the monopod to be moved forward and/or backward with respect to the front of the belly plate. In one embodiment, the second axis allows movement in about a 180-degree range of motion, while in other embodiments, the hinge may include stopping mechanisms or the like to limit the range of movement in the second axis to 90 degrees or less. In several embodiments, the hinge includes a mechanism for holding the monopod in position with respect to one or both axes. In one such embodiment, a screw may be tightened to selectively prevent the monopod from moving. In other embodiments, a clip, belt, hook or other device may be used.

In some embodiments, the hinge is provided using a ball head or ball and socket hinge. In one such embodiment, the monopod may be prevented from moving by tightening a screw, which in turn tightens the socket around the ball, locking the hinge in place. In other embodiments, the hinge may include other hinging or rotatable mechanisms, such as a compound hinge including a first hinge defined along the first axis and a second hinge defined along the second axis. In some embodiments, the hinge allows for motion with respect to both axes at the same time.

Attached to the hinge is the first end of a monopod. In several embodiments monopod may be a relatively rigid, extendible member. In some embodiments, rather than a monopod, any elongate member may be attached at a first end to the hinge, where the second end of the elongate member is adapted to receive some other device. The monopod may be an extendable/retractable piece having a length which may be selectively varied by a user of the device. The monopod may include a mechanism for allowing rotation of the monopod along its longitudinal axis. The second end of the monopod may be adapted to receive a gimbal head, a tilt head, or other camera holding apparatus. Additional embodiments are adapted for use with non-camera accessories.

In another embodiment, a device for supporting a camera comprises securing means for securing the device to the torso of a user, hinging means coupled to the securing means for providing a hinge location, the hinging means providing hinging action along more than one axis, and an elongate member having a first end and a second end, wherein the first end is coupled to the hinging means. The device may further comprise locking means for locking the elongate member into place. The second end, in some embodiments, may include a receiver for an additional device. In some embodiments, the additional device is a camera holding apparatus.

DETAILED DESCRIPTION OF THE SEVERAL EMBODIMENTS

The following detailed description should be read with reference to the drawings. The drawings, which are not necessarily to scale, depict illustrative embodiments and are not intended to limit the scope of the invention.

Figure 1:
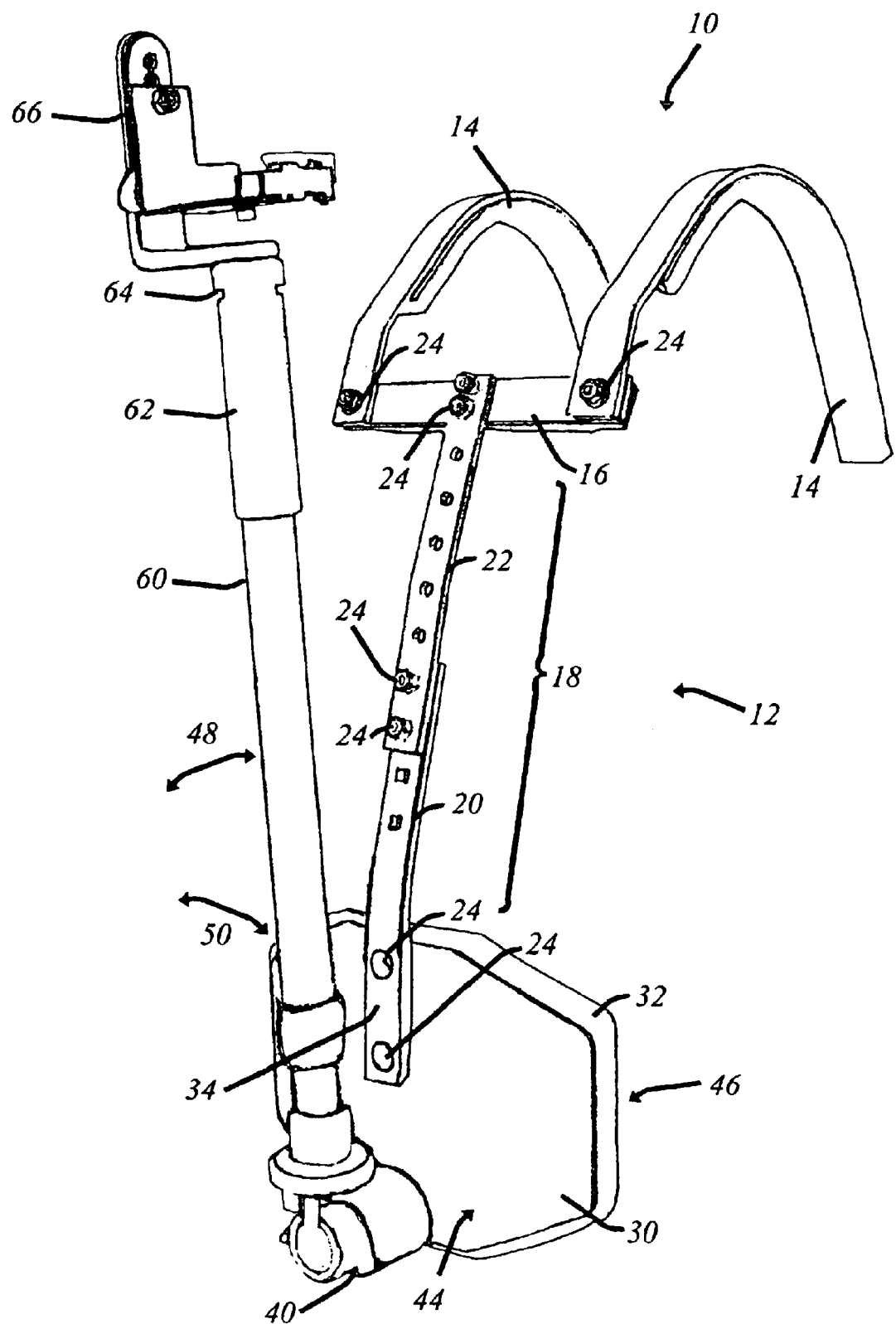
FIG. 1 is a line diagram of an illustrative embodiment of the present invention.

FIG. 1 is a line diagram of an illustrative embodiment of the present invention. FIG. 1 illustrates a camera support device 10 which includes three major pieces, a securing means 12, a hinging means 40, and a monopod 60. The securing means 12 illustrated in FIG. 1 is generally a shoulder harness design, including shoulder straps 14, a crossbar 16, and an adjustable length strap 18 which connects the crossbar 16 to a belly plate 30. The belly plate 30 is shown in a generally polygonal shape, however, any suitable shape may be used, for example, an oval or a T-shaped plate. Belly plate 30 may be made of a rigid or semi-rigid material, for example, in one embodiment, the belly plate is made of metal, while in other embodiments, fabric, plastic or composite structures may also be used.

Bolts 24 are illustrated as connecting the several pieces of the securing means 12, although other mechanisms may also be used, for example, Velcro™ attachments, buttons, snap-on pieces or other removable or selectively connecting mechanisms. Additionally, the bolts 24 could be replaced by more permanent connections such as welds, though removable connecting mechanisms may be preferred if the camera support device 10 is to be disassembled for travel purposes.

In the illustrative embodiment of FIG. 1, the use of bolts or other selective connecting mechanisms that can be removed allows a user to change the size of the device by, for example, shortening the adjustable length strap 18. As shown, the adjustable length strap 18 includes a lower portion 20 and an upper portion 22. The lower portion 20 and upper portion 22 include several holes for attachment, and, as can be seen from the Figure, the bolts 24 may be placed through different combinations of holes in the lower portion 20 and upper portion 22 to select the overall length of the adjustable length strap 18.

Many other structures may be used in place of the adjustable length strap 18, for example, a set screw or other pinching mechanism may be used to couple two shorter pieces together at a movable location. Also, a flexible strap and buckle may be used.

Figure 2:
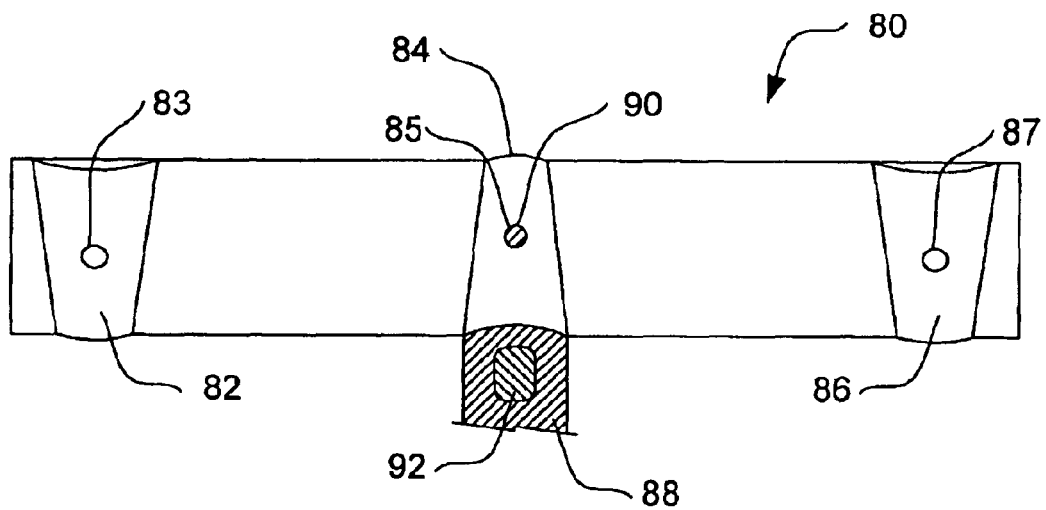
FIG. 2 is a highly diagrammatic sketch of an illustrative attachment mechanism for at least the cross bar.

The back 46 of the belly plate 30 may include a pad 32 which may make the camera support device 10 more comfortable for a user to wear. The belly plate 30 may also include a receiver 34 for receiving the adjustable length strap. The receiver 34 may be as simple as a bolt hole as shown in FIG. 1 on the crossbar 16, or the receiver 34 may be any other coupling or attachment device, for example, as shown in FIG. 2. In several embodiments, a buckle device may be used at the receiver 34.

In some embodiments, instead of the shoulder straps 14, the crossbar 16 and the adjustable length strap 18 (which collectively define a shoulder harness), the belly plate 30 may be coupled to a belt which wraps around the waist of a user, or may be coupled to a vest which the user may wear. Additionally, a single-shoulder configuration, lanyard or flexible collar may also be used. Other shoulder harness configurations may also be used, for example, including a strap or belt between the shoulder straps 14 on the back side of the user. It is sufficient for the purposes of the present invention that the securing means 12 provide some mechanism or apparatus for connecting the base of the hinging means 40, to the body of a user.

The front 44 of the belly plate 30 is attached to a hinging means 40. The hinging means 40 may include multiple individual hinges. In several embodiments, the hinging means 40 includes a hinge which provides more than one axis of movement or freedom. In the embodiment shown in FIG. 1, a ball head is shown at hinging means 40, allowing for both lateral movement as designated by arc 50 and forward movement as designated by arc 48. In other embodiments, a first single axis hinge may be provided to allow lateral movement, and a second single axis hinge used to allow forward movement. In another embodiment, a single axis hinge may be provided to allow forward movement, and a radial bearing may be provided within hinging means 40 to allow lateral movement. In one such embodiment, the radial bearing may be adapted to "click" into several positions about an axis, allowing for steady support at a chosen position.

A monopod 60 is attached to the hinging means 40 by any suitable mechanism or apparatus. For example, the base of the monopod 60 and the hinging means 40 may be adapted to thread together or to lock together. In another embodiment, the monopod 60 and hinging means 40 may each include one or more bolt holes so that the pieces may be bolted into place. In additional embodiments, adhesives or mechanical attachment devices may be used to secure the monopod 60 to the hinging means 40. Once attached, the monopod 60 can move in at least one of lateral direction 50 or forward direction 48. In several embodiments, the monopod 60 may include a mechanism, or the hinging means 40 may include a mechanism, allowing rotation of the monopod 60 along its axis as well. In one such embodiment, a ball head hinge is used, the ball allowing rotation of the monopod about its own axis. In at least one embodiment, the monopod 60, once attached, is allowed to move with relative freedom in the lateral direction 50 and the forward direction 48, as well as to rotate about its own axis.

The illustrative monopod 60 in FIG. 1 includes a foam handle 62, which is optional. The monopod 60 also includes a threaded portion 64. The threaded portion 64 may be similar to designs known in the art for attaching camera holding apparatuses such as the gimbal head 66 illustrated in FIG. 1. A number of other heads, for example, a tilt head such as that shown in FIG. 5, may be used interchangeably on monopod 60.

In use, a photographer would wear the apparatus, with the belly plate 30 approximately resting near the waistline of the user. The user may change the length of the adjustable length strap 18 so that the belly plate 30 rests at a comfortable position. The user can also change the length of the monopod 60 in several embodiments, though rigid, single length monopods could also be used. In one such embodiment, the monopod is attached to a hinge means 40 which may be moved, for example, by adjusting the length of the adjustable length strap 18, or by moving the hinge means 40 relative to the belly plate 30.

Either while wearing the camera support device 10 or before putting it on, the user may place a device such as gimbal head 66 or any other camera holding device on the end of the monopod 60 using threaded portion 64. The user may interchange the device attached at threaded portion 64 at any time, and the user may also change the camera and/or lens attached to whatever device is attached at the threaded portion 64. While wearing the camera support device 10, and with a camera and camera holding device in place on the monopod 60, the user can then take photos aided by the support and stability offered by the camera support device 10. Because the camera support device is worn, rather than set on the ground, the user can easily move from location to location. Additional accessories, such as bags, hooks, pouches and the like, may be added to the camera support device 10 as desired. Such accessories may be useful for holding extra lenses, additional cameras, film, maps, wallets, watches, etc.

Though the above description makes use of the term monopod, in other embodiments, any elongate member may be used in place of the monopod. The elongate member may be rigid or flexible, and may have an adjustable length. Also, while the above description generally relates to photography, other devices may be attached to the end of the elongate member, for example, binoculars or a telescope, a firearm, or any other device where the weight of the device may be supported, or where a steady hold is useful.

FIG. 2 is a highly diagrammatic sketch of an illustrative attachment mechanism for at least the cross bar. The crossbar 80 includes three receivers 82, 84, 86, each including a pin hole 83, 85, 87. As shown, the receivers 82, 84, 86 are shaped to receive a tapered member such as an elongate member 88. The elongate member 88, for the illustrative crossbar 80, may be the upper part 22 of an adjustable length strap 18 as shown in FIG. 1. A pin 90 is shown extending into the pin hole 85, locking the elongate member 88 into the receiver 84. The pin 90 may be coupled to a button 92 on the elongate member 88. A user would be able to depress the button 92 in order to cause the pin 90 to retract from the pin hole 85, allowing the elongate member 88 to be easily removed from the receiver 84. The configuration shown in FIG. 2 is merely an illustrative example of one way of providing a camera support device that can be easily disassembled. Similar receivers may be used elsewhere in the device, too, for example, for joining the adjustable length strap to the belly plate (FIG. 1).

Figure 3:
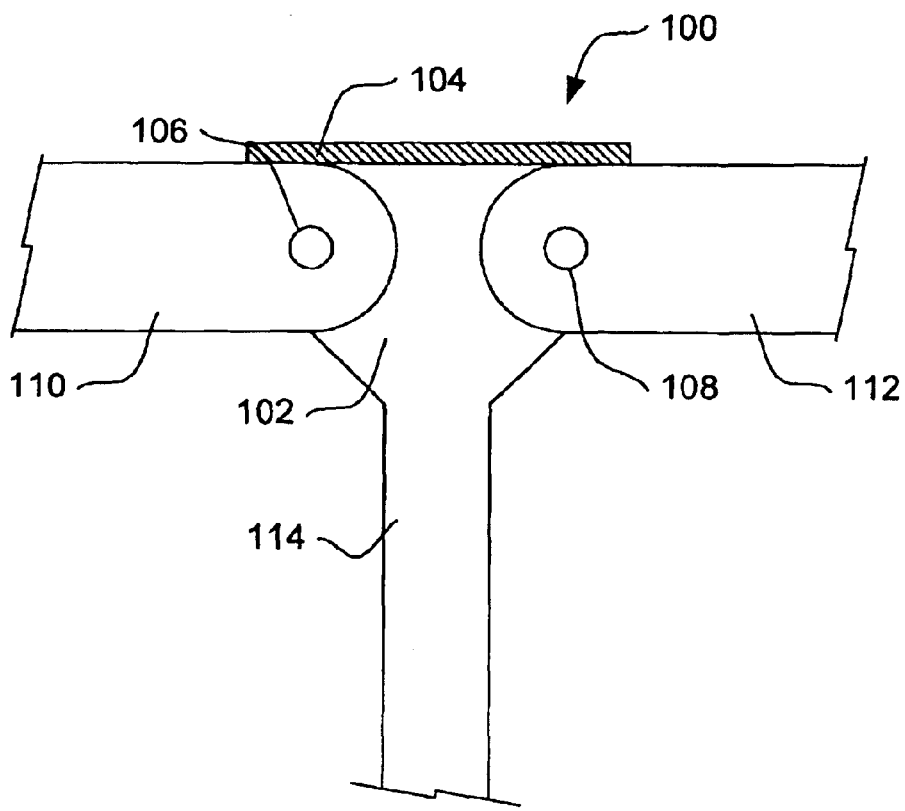
FIG. 3 is another sketch of an illustrative collapsible crossbar.

FIG. 3 is another sketch of an illustrative collapsible crossbar. The crossbar 100 includes a joint portion 102 having a stop 104 and two pivots 106, 108. The pivots 106, 108 hold two arms 110, 112 to the crossbar 100, which also includes center member 114. When the crossbar 100 is in use, the arms 110, 112 may be in their extended position as shown in FIG. 3. When a user is done using the crossbar 100, the arms 110, 112 may be retracted by turning the arms 110, 112 about the pivots 106, 108 until the arms 110, 112 are parallel with the center member 114. The stop 104 prevents the arms 110, 112 from extending beyond the position shown in FIG. 3. Again, the configuration shown in FIG. 3 is merely an illustrative example of one way to make a camera support device that is readily collapsible and easily transported.

Figure 4:
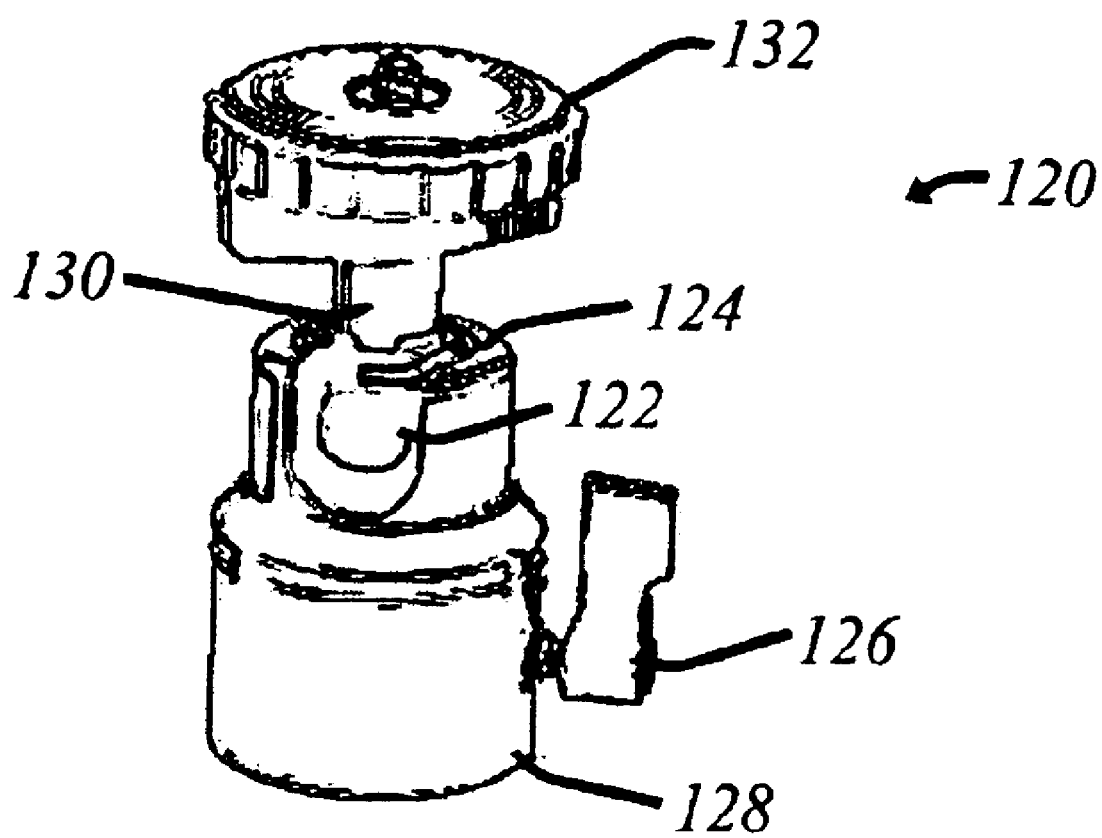
FIG. 4 is a line diagram of an illustrative ball head hinge.

FIG. 4 is a line diagram of an illustrative ball head hinge. The ball head hinge 120 includes ball 122 which is set into a socket area 124. The socket 124 is sized to allow the ball 122 to be rotated and turned within the socket 124. A clamp 126 is attached to the base 128, allowing the base 128 to be secured to another device by tightening the clamp 126. A shaft 130 is connected to the ball 122 at a fixed location, so that movement of the ball 122 within the socket 124 causes the shaft 130 to move. The other end of shaft 130 is connected to receiver 132, which is adapted to receive other devices such as an elongate member or a monopod.

The ball head hinge 120 is one example of a hinge which allows for movement about multiple axes simultaneously. This is in contrast to a hinge, as one would find for example on a door, which allows movement about a single axis. Multiple single-axis hinges may be used in conjunction with one another to effect a similar range of motion as may be had with the ball head hinge 120 in some embodiments. For those embodiments of the present invention which make use of hinging means that allow movement about multiple axes, either a single hinge device such as a ball head hinge or multiple single-axis hinges may be used to effect the multiple-axis freedom of movement, though any structure allowing such function will suffice.

Figure 5:
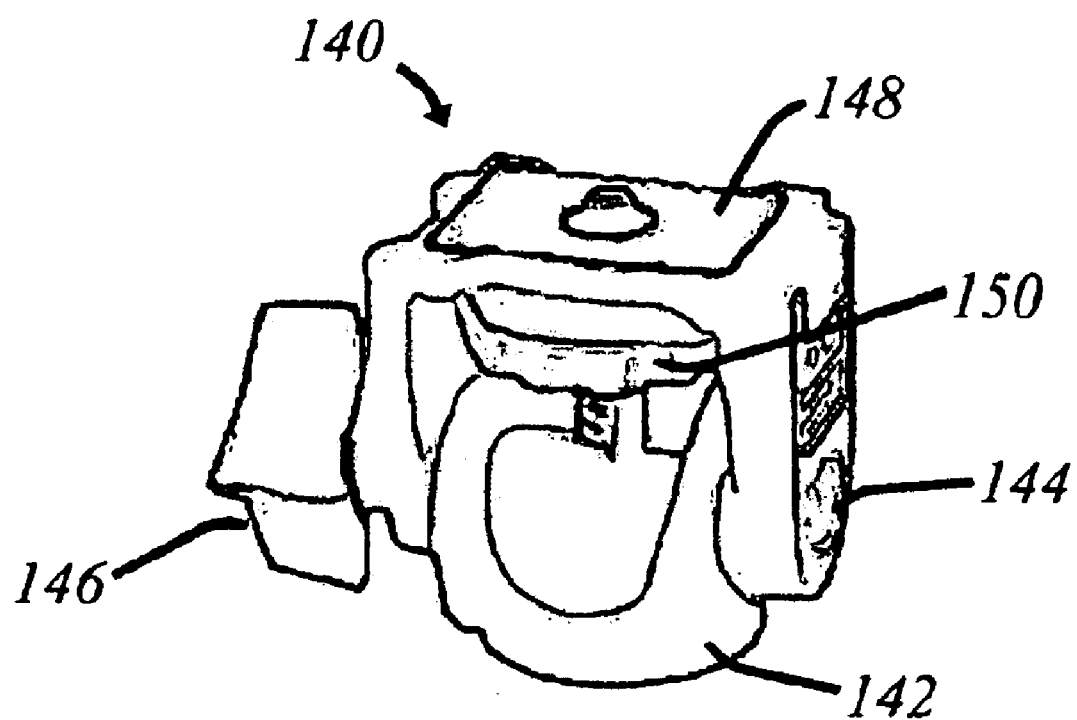
FIG. 5 is a line diagram of an illustrative tilt head for holding a camera.

FIG. 5 is a line diagram of an illustrative tilt head for holding a camera. The tilt head 140 includes a base 142 which may include threading or other apparatus for attaching to the end of a monopod or tripod or the like, including for attachment to an elongate member or monopod 60 as shown in FIG. 1. The base 142 is connected by a pivot 144 to a camera receiver 148. The pivot 144 is controlled by clamp 146. By tightening the clamp 146, the camera receiver 148 can be locked into a particular place with respect to the base 142, while loosening the clamp 146 allows a user to tilt the camera receiver 148 with respect to the base 142. A screw 150 is provided attached to the camera receiver 148 for allowing a user to attach and secure a camera to the camera receiver 148.

Figure 6:
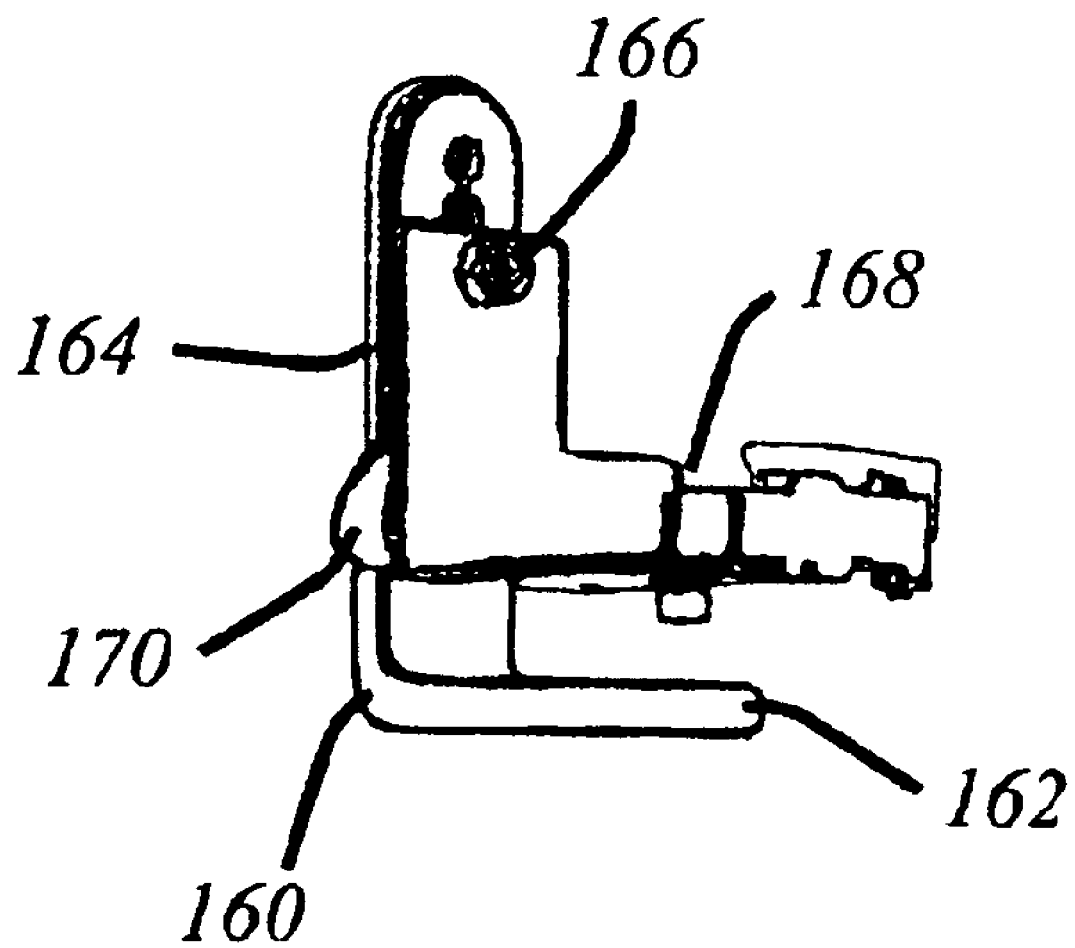
FIG. 6 is a line diagram of an illustrative gimbal head for holding a camera lens.

FIG. 6 is a line diagram of an illustrative gimbal head for holding a camera lens. The gimbal head includes an L-shaped piece 160 including a base 162 which, again, may be adapted to attach, for example by threading, to a monopod 60 as shown in FIG. 1. The L-shaped piece also includes a side arm 164 which in turn couples to a pivot pin 166. The pivot pin 166 connects the side arm 164 to a lens receiver 168, allowing the lens receiver 168 to be tilted with respect to the base 162. The pivot pin 166 may include a clamp (not shown) for locking the pivot pin 166 into a position at a particular tilt with respect to the base 162. The lens receiver 168 is a conventional piece which is adapted to secure a camera by its lens. Such receivers 168 are known in the art for use in particular with larger, heavier lenses that may be used in a variety of situations well understood by those of skill in the photographic field. The gimbal head is also provided with a plastic pad 170 which aids in pivoting the receiver 168 forward and back about pivot pin 166. The pad 170 also makes the receiver 168 more stable with respect to the L-shaped piece 160. Though not shown in FIG. 6, the L-shaped piece 160, at base 162, may include a threaded portion to thread into or mate with the end of a monopod.

The heads illustrated in FIGS. 5 and 6 are merely examples intended to show certain additional aspects of the present invention. In several embodiments, a wide range of devices, adapters and the like, including the heads may be readily interchanged because the bases, for example bases 142, 162, include similar mechanisms for attachment to a monopod 60 (FIG. 1).

Figure 7:
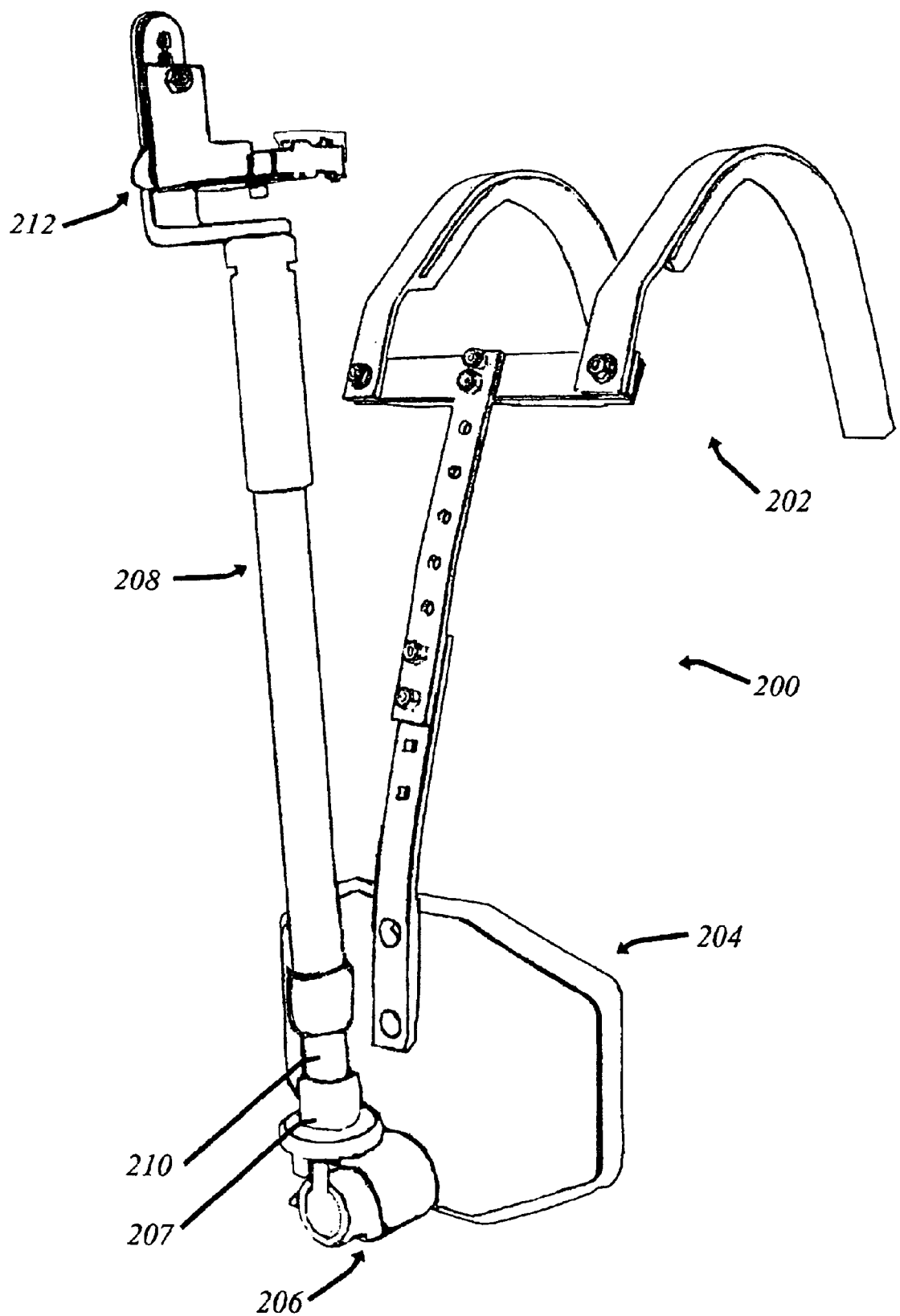
FIG. 7 is a line diagram illustration of a working example.

A working embodiment 200 of the present invention will now be described with reference to the line diagram illustration of FIG. 7. The actual devices used and manner of preparing or modifying such devices should not be interpreted as limiting the invention to these devices, but instead provide illustration to enable one of skill in the art to make and use the present invention.

A shoulder harness 202 and belly plate 204 device was made with the use of a drum harness for use in a marching band, these two elements collectively defining a securing apparatus. The coupling of the shoulder harness 202 to the belly plate 204 was used, but the belly plate 30 was stripped so that a ball head hinge 206 could be attached. The hinge 206 includes a receiver 207 onto which a device being attached to the hinge 206 could be placed. A monopod 208 was purchased and cut short to a length of about 13 inches. The lower portion of the monopod 208 beneath the cut was discarded.

The retained portion of the monopod 208 was secured to the receiver 207 by first gluing a threaded three-eights inch cap to the monopod, and screwing the threaded cap to the receiver 207. The retained portion of the monopod 208 included an adjustable length portion which allowed the user to change the length of the monopod so that a camera could be aimed at higher or lower objects. The monopod 208 included a standard, quarter-inch, threaded upper end to which a gimbal head 212 was attached. The device was tested and found to provide improved stability, helping the user take photos more easily, without significantly impeding the user's ability to aim at different objects quickly and easily. The gimbel head 212 was similar to that shown in FIG. 6, and was interchanged with a tilt head similar to that shown in FIG. 5.

With respect to the given working example, by using a monopod to couple to an apparatus for receiving a camera, the working embodiment allows for interchangeability with devices used to support cameras in conjunction with tripods and monopods already in use. Further, by using a monopod which is moveable across a wide range of movement about more than one axis and in a variety of manners, the device allows a user great freedom to capture shots quickly and easily. The simplicity of design allows a user to easily move around to capture photos from different locations quickly.

Figure 8:
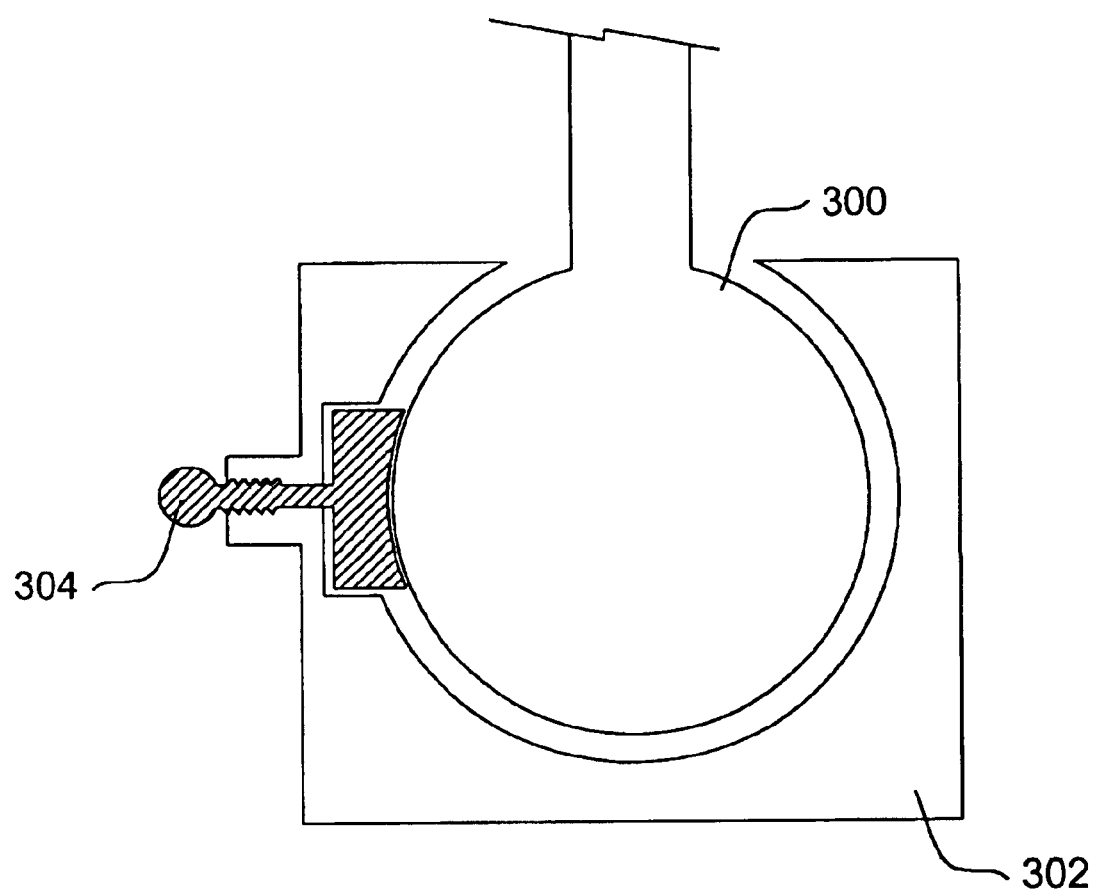
FIG. 8 shows in schematic cross section an illustrative ball hinge.

FIG. 8 shows in schematic cross section an illustrative ball hinge. The illustrative ball hinge includes a ball 300 inside a socket 302. In order to lock the ball 300 in place in the socket 302, a screw 304 may be turned to press a pad attached to the screw 304 against the ball 300. In effect this tightens the socket 302 so that the ball 300 is prevented from moving.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A device for supporting a camera comprising:

a hinge;

an apparatus for securing the hinge to the body of a user including a rigid shoulder harness; and an elongate member attached to the hinge in such a way as to allow the elongate member to be moved about more than one axis;

wherein the hinge is a ball head hinge.

2. The device of claim 1, wherein the elongate member is a monopod.

3. The device of claim 1 wherein the apparatus for securing the hinge to the body of a user includes a rigid strap and a belly plate, the rigid strap connecting the belly plate to the shoulder harness.

4. The device of claim 3, wherein the monopod has an adjustable length.

\* \* \* \* \*

UNITED STATES PATENT AND TRADEMARK OFFICE
CERTIFICATE OF CORRECTION

PATENT NO. : 6,764,231 B1
DATED : July 20, 2004
INVENTOR(S) : Cory Shubert

Page 1 of 1

It is certified that error appears in the above-identified patent and that said Letters Patent is hereby corrected as shown below:

Column 1,
Line 42, delete "extendible" and insert therefor -- extendable --.

Column 8,
Line 21, delete "claim 3" and insert therefor -- claim 2 --.

Signed and Sealed this

Fourth Day of January, 2005

JON W. DUDAS
*Director of the United States Patent and Trademark Office*